(12) United States Patent
Kölhi et al.

(10) Patent No.: US 8,351,452 B2
(45) Date of Patent: Jan. 8, 2013

(54) MEDIA TRANSPORT PROTOCOL SELECTION

(75) Inventors: Johan Kölhi, Vaxholm (SE); Jonathan Olsson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 317 days.

(21) Appl. No.: 12/602,186

(22) PCT Filed: May 31, 2007

(86) PCT No.: PCT/EP2007/055313
§ 371 (c)(1),
(2), (4) Date: Nov. 30, 2009

(87) PCT Pub. No.: WO2008/145187
PCT Pub. Date: Dec. 4, 2008

(65) Prior Publication Data
US 2010/0177773 A1    Jul. 15, 2010

(51) Int. Cl.
*H04L 12/54* (2006.01)
(52) U.S. Cl. ........................................................ 370/429
(58) Field of Classification Search .................. 370/229, 370/230–231, 235, 236, 241, 252, 351, 389, 370/390, 392, 400, 412, 419, 422, 427–429
See application file for complete search history.

(56) References Cited

U.S. PATENT DOCUMENTS

| 2003/0033423 | A1* | 2/2003 | Okabe et al. ................... 709/232 |
| 2003/0051251 | A1 | 3/2003 | Sugimoto et al. |
| 2003/0131044 | A1 | 7/2003 | Nagendra et al. |
| 2004/0114583 | A1* | 6/2004 | Cetin et al. ..................... 370/360 |
| 2005/0281270 | A1 | 12/2005 | Kossi et al. |
| 2007/0214279 | A1* | 9/2007 | Choi et al. ..................... 709/231 |
| 2008/0069100 | A1* | 3/2008 | Weyman et al. ............... 370/390 |
| 2008/0263130 | A1* | 10/2008 | Michalowitz et al. ........ 709/202 |

FOREIGN PATENT DOCUMENTS

| JP | A 2005-109539 | 4/2005 |
| JP | A 2005-322022 | 11/2005 |
| JP | A 2007-081869 | 3/2007 |

* cited by examiner

Primary Examiner — Omar Ghowrwal

(57) ABSTRACT

A method and network node for distributing media across an IP network, the network node having multicast and peer-to-peer ingress interfaces, and unicast and peer-to-peer egress interfaces. For each of a plurality of contents, the network node selects an ingress interface and receives media packets representing the content at the selected interface. For each media packet received, the network node determines from information conveyed in the media packet whether that media packet can be cached at the network node and caches the media packet if permitted. When the network node receives a request from a further network node for a given content, the network node selects an egress interface and forwards media packets representing the given content to the further network node over that selected interface. If media packets representing the given content were cached, the cached media packets are forwarded to the further network node.

8 Claims, 3 Drawing Sheets

MEDIA TRANSPORT PROTOCOL SELECTION

TECHNICAL FIELD

The invention relates to a method and apparatus for selecting a transport protocol for media over an IP network, and also to an architecture for facilitating multi-protocol media transport.

BACKGROUND

Internet Protocol Television or IPTV is a term used to refer to the delivery of television and video (collectively referred to below as "TV") over IP-based communication networks. IPTV is in fact a collection of protocols including compression, playout, and distribution protocols. In terms of distribution across networks, three classes have been defined, namely multicast, unicast, and peer-to-peer distribution.

Of these, it is envisaged that multicast will be used mainly for live-streaming of TV. Multicast relies upon the IETF defined Internet Group Management Protocol (IGMP) to create and change multicast receiver groups at multicast agents within an IP network. Multicast agents receive TV and multicast it onwards to group members. Multicast is a very effective mechanism for transporting a set of TV channels to a large number of viewers. Multicast is not however a suitable distribution mechanism for so-called "time-lapse" TV, where a viewer can pause a live-TV program and then resume watching it at a later time. Also, the efficiency gained by using multicast decreases with the number of viewers.

Unicast distribution typically relies upon the Real Time Streaming Protocol (RTSP) which allows a client to remotely control a streaming media server, issuing VCR-like commands such as "play" and "pause", and allowing time-based access to files on a server. Unicast creates individual sessions for each connected user, so the same content will get transferred once per user over the network. Since each session is individual, pausing, resuming, rewinding and forwarding can easily be implemented when unicast is used. Unicast is a suitable method for Video-on-Demand, time-lapse TV and similar (more personal) TV services. A disadvantage of unicast distribution is that it consumes a large amount of bandwidth for live-TV.

Peer-to-peer distribution (also know as "P2P") uses each client and/or node in a network for the distribution of media. When a program is viewed by a given client/node, different parts of the program can be downloaded from different neighbouring clients/nodes. Network operators might want to implement restricted P2P distribution within their own networks, with content being cached at multiple nodes within a given network for onward transfer to clients. Clients may or may not be able to share content between each other. Peer-to-peer has a lot of advantages and lies somewhere in between unicast and multicast when it comes to bandwidth usage. Whilst peer-to-peer distribution can be less bandwidth efficient that multicast, it does offer the possibility of time-lapse play even for live TV. Of course, peer-to-peer distribution is not so satisfactory for live TV as significant delays result from the need for different nodes to cache and forward different parts of a program.

The decision as to which distribution mechanism to use for IPTV is therefore very much dependent upon the service to be delivered and the network capabilities/performance, as well as upon the quality of service (QoS) acceptable to the viewers. Distribution mechanism selection is also important when it comes to services other than IPTV, such as gaming.

Existing applications are usually designed for a single distribution method. There is no flexibility for example for a set top box to choose whether to receive a TV feed via a multicast or unicast channel, let lone switch in the middle of the feed from one method to another in an attempt to optimize performance.

It is desirable to allow one or both of the source or destination of IPTV (or other media) to select the distribution mechanism according to prevailing conditions and requirements. Moreover, it is desirable to achieve this in such a way that media can be distributed over different legs of a transmission path using different distribution mechanisms, and so that the mechanism can be changed during a given session.

Another very complex problem with media today is that operators are not allowed to cache all content due to different licensing restrictions for different media. This is typically solved by selecting multicast for live-TV (no caching) and unicast for video-on-demand (caching). The result is wastage of bandwidth in the network due to some media clips being uncachable.

Media distribution schemes are described in US2005/0281270 and US 2003/0051251.

SUMMARY

According to a first aspect of the present invention there is provided a method of operating a network node to distribute media across an IP network. The method comprises, at the network node, selecting one of a multicast and peer-to-peer ingress interface and receiving media packets at the interface. For each media packet received at the node, the method comprises determining from information conveyed in the packet or associated packets whether that packet can be cached at the node and caching the packet if permitted. At the node, one of a unicast and peer-to-peer egress interface is selected and packets forwarded to one or more further nodes over that interface.

Embodiments of the present invention allow media packets to be identified as either cacheable or uncachable and handled accordingly. Where caching is permitted, this facilitates in particular onward distribution over the unicast and peer-to-peer egress interfaces regardless of the nature of the ingress interface.

The network node may register with one or more other network nodes to receive multicast and/or peer-to-peer media. Alternatively, or in addition, the network node may be located at an existing distribution node such that it is disposed within existing media flows.

The method may comprise registering one or clients and/or other network nodes and distributing unicast and/or peer-to-peer media to the registered client(s)/node(s).

According to a second aspect of the present invention there is provided a client terminal for receiving IP media over an IP distribution network according to a multicast, unicast, and peer-to-peer protocol. The terminal comprises means for determining whether or not received media is tagged as cacheable and, if so, for caching the media in a local cache, and means for subsequently distributing cached media to one or more other client terminal, across said IP distribution network using a unicast or peer-to-peer protocol. A typical implementation of the terminal may be as a settop box.

According to a third aspect of the present invention there is provided a method of distributing media from one or more media head-ends to a multiplicity of clients across an intermediate network. The method comprises at a media head-end, tagging media as cachable or non-cacheable, and sending tagged media from the head-end to the network using one or more of a multicast, unicast and peer-to-peer protocol. Media is received at a network caching node according to the sending protocol and a determination made as to whether or not received media is cachable based upon accompanying tags and, if yes, the media is cached at the caching node. Cached media is subsequently distributed from the caching node to clients using one of a unicast and peer-to-peer protocol.

The caching node may be registered with one or more multicast agents to cause multicast media to be sent to the caching node. The method comprises receiving media at a plurality of caching nodes within the intermediate network, caching media at each of the network nodes, and subsequently distributing media from the nodes to clients using one of a unicast and peer-to-peer protocol.

In a preferred embodiment of the invention, media is received at a client according to one of a multicast, unicast and peer-to-peer protocol, a determination made as to whether or not received media is cachable based upon accompanying tags and, if yes, the media is cached at the client. Cached media is subsequently distributed from the client to other clients or caching nodes using one of a unicast and peer-to-peer protocol.

According to a fourth aspect of the present invention there is provided a network node configured to distribute media across an IP network. The node comprises a first selector for selecting one of a multicast and peer-to-peer ingress interface and receiving media packets at the interface. A packet handler determines, for each media packet received at the node, from information conveyed in the packet or associated packets, whether that packet can be cached at the node and caching the packet if permitted. A second selector selects one of a unicast and peer-to-peer egress interface and forwards packets to one or more further nodes over that interface.

According to a fifth aspect of the present invention there is provided a media head-end for distributing media to a multiplicity of clients across an intermediate network. The head-end may be a video head-end associated with an IPTV service. The head-end comprises a packet handler for tagging media as cacheable or non-cacheable, a selector for selecting one of a multicast, unicast and peer-to-peer protocol, and a transmitter for transmitting tagged media across said network according to the selected protocol.

DETAILED DESCRIPTION

Figure 1:
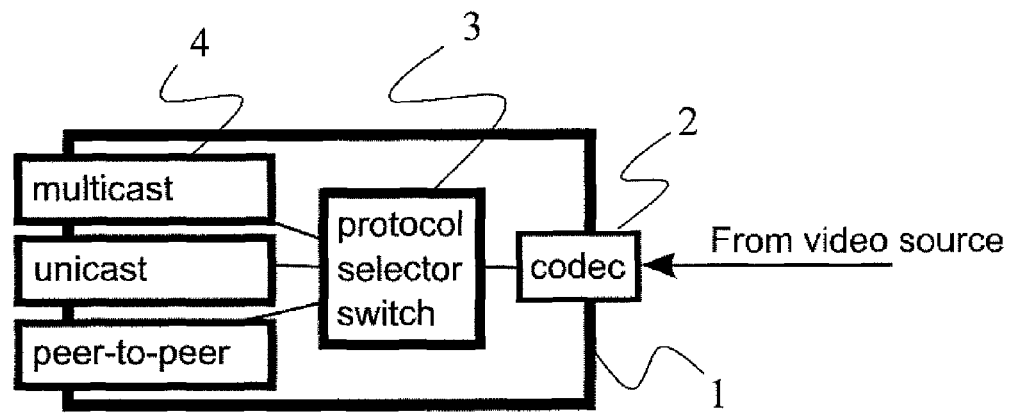
FIG. 1 illustrates schematically a video head-end of an IPTV distribution system.

FIG. 1 illustrates schematically a video "head-end" 1 such as might be present within the domain of an IPTV service provider. The head-end receives a media stream (at least video and audio) and inputs this to a codec 2, for example an MPEG4 codec. The video head-end has a special protocol selector switch function 3 located between the codec 2 and a network transmission stack 4. The switch 3 does the following. Firstly, it selects the most suitable distribution mechanism from multicast, unicast, and peer-to-peer within the transmission stack. Secondly, it tags the media stream as either cacheable or non-cacheable. The selector switch can either use a fixed configuration, or it could be controlled by an external function to switch the distribution method for optimum bandwidth use and to reflect changes in popularity for certain media.

Media sent out by the video head-end 1 is tagged as either cacheable or non-cacheable. This may be done by the video head-end itself. However, it is more likely that the media will be tagged at source. Tags may be included, for example, in IP or Ethernet packet headers.

Figure 2:
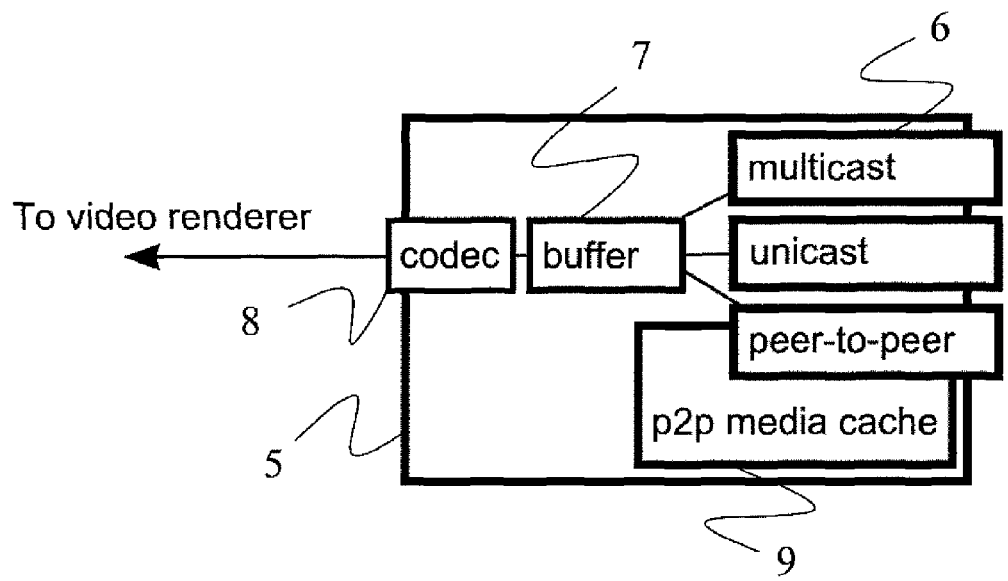
FIG. 2 illustrates schematically a video receiver of an IPTV distribution system.

FIG. 2 illustrates schematically a video receiver node 5 which might be located within a set top box as part of an operator's IPTV offering. The receiver node 5 has network receiver stack 6 for multicast, unicast and peer-to-peer distribution mechanisms. The respective ingress interfaces are all connected to a common buffer function 7 that has the necessary buffer space for the media transmitted. A decoder function 8 is situated after the buffer 7 and is responsible for rendering the transmitted media.

The receiver function at the video receiver node has an attached media cache 9 that is controlled to an extent by the transmitted media. The media cache 9 is preferably associated with all three receiver interfaces. If a media clip is transmitted with a cacheable-flag set, the media cache can if it wishes store this media and transmit it to other clients in the network asking for this specific media, typically via the peer-to-peer distribution mechanism. However, if a media clip is flagged as non-cacheable, the media clip cannot be cached by any node in the peer-to-peer network. [It is assumed that the logic required to read a flag and act accordingly cannot be altered by an end user, and that an end user cannot change the flag setting.] Of course, P2P distribution is still possible even without network/client caching, in which case media will be downloaded from the originating source. However, this is inefficient.

The functionality described above allows operators and content owners to control how individual media clips are handled by the network transmission functions. Copyright, non-cacheable media can co-exist with cacheable media in the same network and still use peer-to-peer as a transmission method.

Figure 3:
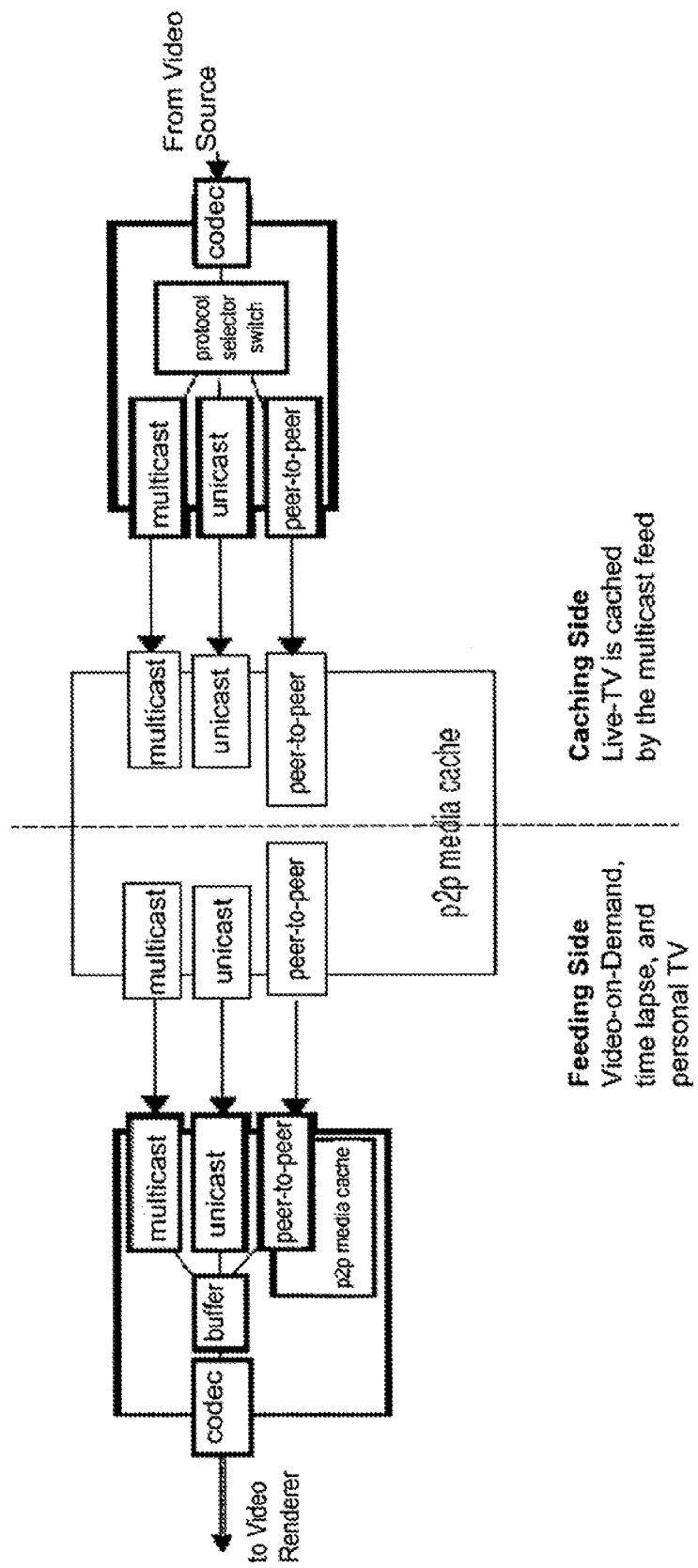
FIG. 3 illustrates a network caching node interposed between the head-end of FIG. 1 and the receiver of FIG. 2.

FIG. 3 illustrates a possible network architecture which facilitates the dynamic selection of distribution mode between a video head-end 1 and a receiver 5. It is assumed that these are both attached to an intermediate, IP network. In one example, the intermediate network is provided by a cellular communications system, e.g. an operator's GPRS network. Within the intermediate network, the operator maintains a set of network caching nodes. One such node 10 is illustrated in FIG. 3. In the case of a GPRS network, the caching nodes could be located for example at GGSNs.

A network caching node 10 has an ingress or caching side 11 at which it receives media from the video head-end, possibly via one or more other caching nodes. The caching side has multicast, unicast, and peer-to-peer interfaces for receiving data. The node has an egress or feeding side 12 for distributing media downstream. The feeding side also has multicast, unicast, and peer-to-peer interfaces. The node 10 is provided with a media cache 13. The intermediate network consists of all clients (both set top boxes and dedicated caching nodes in the network). It is run in a self-organizing way to a large extent, a true overlaid application. However, due to operator control of the network, data flows can be prioritised which is not the case with conventional Internet-based P2P networks.

The role of the network caching node is to obtain media from the video head-end. Typically this is done using multicast for live media and peer-to-peer for on demand media, although unicast is also possible. Typically, a caching node will register for all significant live multicasts, and for popular video-on-demand media. Assuming that media is flagged as cachable, the node caches the media, otherwise it discarded. On the feeding side, the node receives media requests from video receivers. Typically, media will be distributed downstream via either unicast or peer-to-peer. Multicast distribution is unlikely, as it is unlikely that multiple users will request time-lapse media at the same time from the same caching node.

Figure 4:
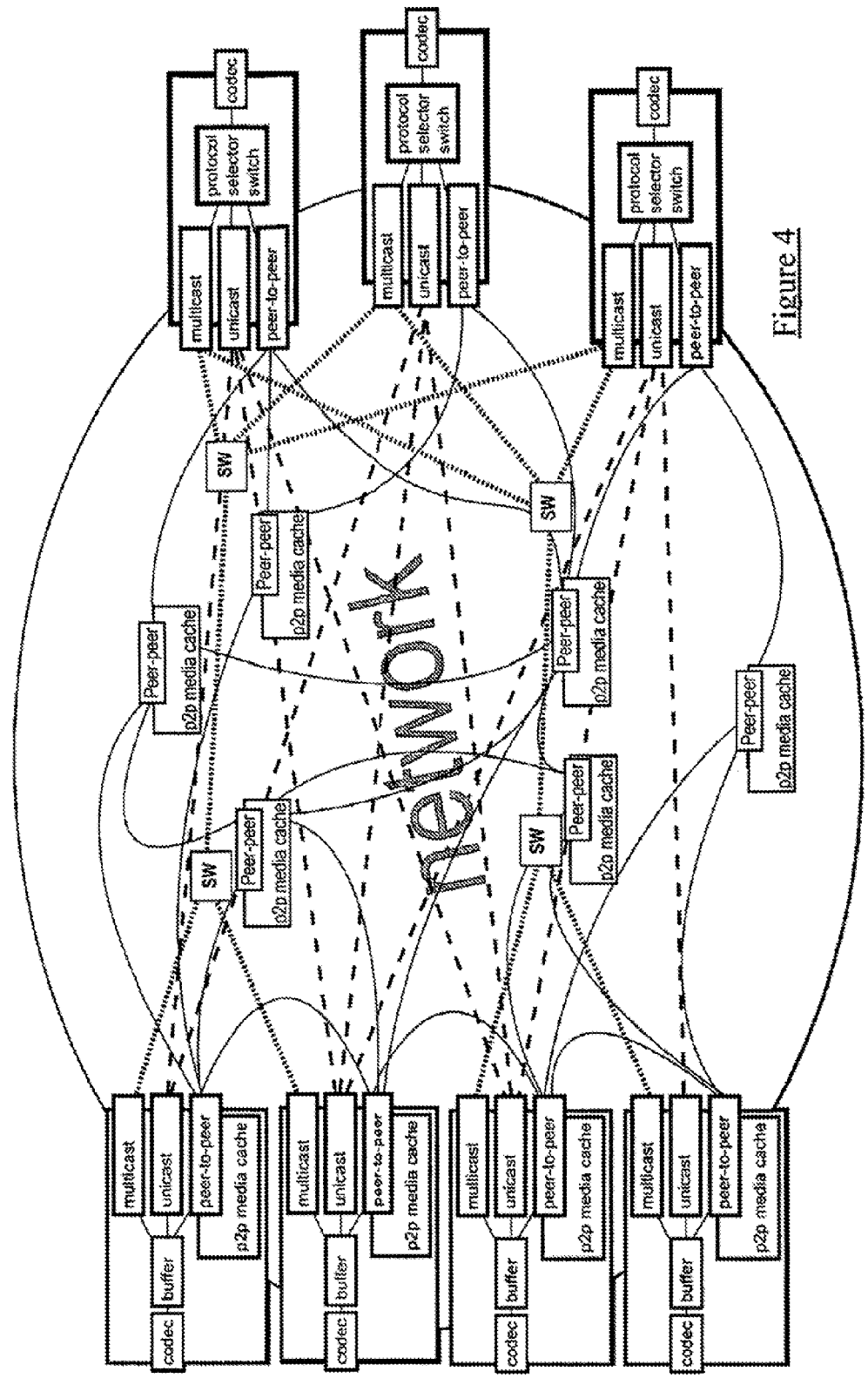
FIG. 4 illustrates schematically a multi-protocol media distribution network.

FIG. 4 illustrates a small example network which demonstrates the flexibility of multicast, unicast and peer-to-peer transport mechanisms running in parallel. The nodes designated as "SW" nodes in the Figure are multicast switches with IGMP snooping. These nodes are standard equipment in broadband networks of today. Typically, a user will register with a multicast switch to receive a multicast programme. A user may also register with a video head-end to receive a unicast media stream directly from the head-end.

The network also contains network caching nodes as described above. A number of these are illustrated in the network of FIG. 4. [NB. The unicast ingress interfaces and the multicast egress interfaces are not shown as these are unlikely to be used in practice.] As already described, the caching nodes can themselves register with the multicast switches to receive multicast media, and can also obtain media via peer-to-peer distribution. If allowed, the received media is cached. In this way, live media is cached into the caching nodes effectively for "free", and can be later replayed downstream as vide-on-demand. As well as receiving multicast media via multicast switches and unicast media direct from the head-end, video receivers can obtain unicast and multicast media from the caching nodes. It might also be possible for receivers to receive unicast and peer-to-peer distributed media from other receivers.

In order to allow the various nodes of the network to interoperate appropriately, a control protocol must be implemented at the various nodes. This control protocol monitors the buffers in the video receivers and network caching nodes and ensures that the required downloads are proceeding correctly. One possibility is to re-use an existing P2P network to contact the other active nodes. The P2P network could be used for control even if the media protocol is unicast or multicast. Another possibility is to use a combination of existing standard control protocols whilst providing additional intelligence in the receiver to make a smooth switch from one method to the other by using a combination of control protocols, e.g. RTSP could be used to control the unicast VoD stream whereas IGMP can be used to control the multicast stream. The control protocol will also be used to control the protocol selector switch and pick the desired protocol for content delivery. This decision could be based on policies in a central controller entity or made by intelligence in the client, e.g. if there is high jitter or frame loss using one method then an alternative method could be selected.

The embodiment described here implements a powerful algorithm to combine state of the art transmission technologies in parallel for multimedia distribution. It does this by making use of already implemented network algorithms and without breaking any implemented protocols. The use of multi-protocol network based media caches, in combination with media tagging, optimises the use of bandwidth throughout the network since they can be fed with one protocol and transmit with another if needed. IPTV and multimedia applications are seen as a major future revenue generator for network operators, and in particular for cellular network operators and the embodiment facilitates these services.

It will be appreciated by the person of skill in the art that various modifications may be made to the above described embodiments without departing from the scope of the present invention. For example, it is possible to integrate the caching node functionality into existing nodes such as the multicast agents (SWs) so that they "listen in to" existing distribution links. In this case, media which is tagged as uncachable is forwarded on to its original destination after inspection by the caching node.

The invention claimed is:

1. A method of operating a network node to distribute media across an IP network, the network node having multicast and peer-to-peer ingress interfaces, and unicast and peer-to-peer egress interfaces, the method comprising:
    at the network node, for each content of a plurality of contents, selecting one of a multicast and peer-to-peer ingress interface and receiving media packets representing the each content at the selected interface;
    for a given media packet received at the network node, determining whether information conveyed in the given media packet includes a copyright licensing restriction prohibiting a media type carried by the given media packet from being cached at the network node, and caching the given media packet if permitted;
    at the network node, receiving a request for a given content of the plurality of contents from one or more further network nodes; and
    at the network node, selecting one of a unicast and peer-to-peer egress interface and forwarding media packets representing the given content to the one or more further network nodes over the selected interface;
    wherein when forwarding media packets representing the given content, if media packets representing the given content were cached, the cached media packets are transmitted to the one or more further network nodes; and
    wherein media packets received at an ingress interface that uses a first media distribution mechanism are forwarded over an egress interface that uses the first or a different, second media distribution mechanism.

2. The method recited in claim 1, further comprising registering with one or more other network nodes to receive multicast and/or peer-to-peer media.

3. The method recited in claim 2, further comprising registering the network node with a multicast agent to receive multicast media from the multicast agent.

4. The method recited in claim 1, further comprising registering one or more clients and/or other network nodes and distributing unicast and/or peer-to-peer media to the one or more clients and/or to the other network nodes.

5. A network node configured to distribute media across an IP network, the network node having multicast and peer-to-peer ingress interfaces, and unicast and peer-to-peer egress interfaces, the network node comprising:
    a first selector, for each content of a plurality of contents, configured to select one of a multicast and peer-to-peer ingress interface, and to receive media packets representing the each content at the selected interface;
    a packet handler configured to determine, for a given media packet received at the network node, whether information conveyed in the given media packet includes a copyright licensing restriction prohibiting a media type carried by the given media packet from being cached at the network node, and to cache the given media packet if permitted;

a receiving interface configured to receive a request for a given content of the plurality of contents from one or more further network nodes; and a second selector configured to select one of a unicast and peer-to-peer egress interface, and to forward media packets representing the given content to the one or more further network nodes over the selected interface;

wherein if media packets representing the given content were cached by the packet handler, the second selector is configured to transmit the cached media packets to the one or more further network nodes; and wherein media packets received at an ingress interface that uses a first media distribution mechanism are forwarded over an egress interface that uses the first or a different, second media distribution mechanism.

6. The network node recited in claim 5, further configured to register with one or more other network nodes to receive multicast and/or peer-to-peer media.

7. The network node recited in claim 6, further configured to register with a multicast agent to receive multicast media from the multicast agent.

8. The network node recited in claim 5, further configured to register one or more clients and/or other network nodes and to distribute unicast and/or peer-to-peer media to the one or more clients and/or to the other network nodes.

* * * * *